Patented July 9, 1940

2,206,889

UNITED STATES PATENT OFFICE 2,206,889

RECOVERY OF BASIC COPPER SULPHATE FROM RAYON MANUFACTURE

Sverre Gulbrandsen, Woodbury, N. J., assignor to New Process Rayon, Inc., Gloucester, N. J., a corporation of Delaware No Drawing. Application May 21, 1938, Serial No. 209,366

17 Claims. (Cl. 23—125)

My invention consists in a process of producing basic copper sulphate and ultimately copper hydroxide, from the dilute waste acid liquor derived from the treatment of coagulated fibre of the cupro-ammonium process of producing rayon yarn and is a continuation in part of my copending application Serial No. 122,367, filed January 26, 1937.

It has for its objects improvement in the efficiency of producing these products, lessening the number of steps heretofore required, simplifying the installation of equipment and its operation, lessening the number of chemical elements required in the recovery processes and thereby generally with the foregoing, cutting down the expense, producing a green basic sulphate instead of a blue, thereby making it possible to produce a thoroughly stable hydroxide, producing a dense crystal structure susceptible to high concentration, and finally the effecting of economies in the utilization of the hydroxide in the production of the cupro-ammonium cellulose solution from which the fibres are spun, a joint result of greater concentration and greater purity. The entire principal process is carried out at usual room temperatures eliminating the expense of heating enormous volumes of liquor.

One of the known types of processes commonly in use prior to my invention is that of my prior Patent No. 2,061,194 for Method of recovering copper from waste solutions, issued November 17, 1936, in which the waste acid solution is passed in a continuous stream into a first tank, there agitated with sufficient caustic soda to precipitate 50 to 75% as basic copper sulphate, continuously overflowing the solution containing the precipitate from the first tank into a second tank, there agitating with the addition of sufficient caustic soda to complete the copper precipitation also as basic copper sulphate, overflowing the mixture of the second tank into a settling tank permitting it to settle, removing the supernatant liquid therefrom, and finally removing the entire precipitate from the settling tank in the form of a dense basic copper sulphate.

This basic copper sulphate was blue or a mixture of the blue and green, with the result that any attempt to produce copper hydroxide therefrom would have resulted in an unstable hydroxide in large part at least. Furthermore, these coupled with other factors dictated the following of the old time practice of effecting immediate conversion into copper sulphate form, or treatment of basic copper sulphate with ammonia and ammonium sulphate to form tetramine copper sulphate at such time as it was desired to manufacture the cupro-ammonium solution for spinning. Before the solution was formed, it was necessary to precipitate from the tetramine copper sulphate the copper in the form of copper hydroxide, using for this purpose the full caustic equivalent of the copper obtained. All of these long steps of the old time process and some of the chemical elements involved are eliminated by my new process.

My new process in the form best known to me at this time is carried out by continuously introducing the waste acid liquor during a day's run into a large tank and on alternate days using another large tank for this purpose, the size of these tanks being sufficient to hold the waste acid liquor for a full day's run of a given number of spinning units. They are conveniently of approximately 50,000 gallons each. No treatment is given the liquor introduced into these tanks during the time the tank is filling to capacity. Of course, this might be a period either less than or more than one day, the important thing being that the tank is large and that nothing is done until the tank is filled. When the one tank is full, then the waste liquor is shifted to the other and the liquor in the first is treated.

The treatment consists in the immediate introduction of sufficient phosphoric acid or soluble phosphate to combine at proper acidity with the iron contained to form ferric-phosphate. However, the iron remains in solution along with the acid until the proper acidity is obtained. As the next step there is introduced sufficient caustic soda or its equivalent to carry the acid to and below the point required for combination of the iron and the phosphoric acid, and the ferric-phosphate produced is precipitated to the bottom of the tank. Thereupon, the solution remaining above the precipitate is drawn out of the tank so treated into a third tank which may or may not be empty, as will later be seen, at the time of drawing-off.

In this third tank the solution drawn off which contains iron-free copper, is treated while the drawing is being done, and under constant agitation with caustic soda sufficient to precipitate as basic copper sulphate 50 to 75% of the copper. At the time of starting such treatment during withdrawal, this third tank contains seed crystals of green basic copper sulphate and through and by virtue of the fact that it does contain such crystals at the time of starting, crystals precipitated during the current treatment are also of green basic copper sulphate.

Seed crystals of green basic copper sulphate are produced originally in this third tank through the treatment of a charge drawn from one of the two initial receiving tanks containing iron free copper, by caustic soda administered in small dosages. This full third tank of the solution containing iron free copper is given first a dosage of caustic soda sufficient to remove but 5 or 10% of the copper as basic copper sulphate. A couple of hours after the reaction of the first dosage of caustic soda appears to have been complete, a second dosage of a like amount is given and after a similar lapse of time a third dosage, and so on until enough caustic soda has been introduced to remove all that can be removed. The initial precipitate is a fine and faint green precipitate and grows more dense and more green with each dosage, until we have suitable green seed crystals of large size and great density.

The green seed crystals having thus been formed and settled, the supernatant liquid is withdrawn and the tank is ready for the continuous process as above set in motion.

As an alternative, instead of directly producing green seed crystals in the treating tank I may produce them elsewhere and initially deposit them in the treating tank. They may be produced from blue basic copper sulphate crystals by boiling the blue crystals to remove the water of crystallization. The blue can be produced in any precipitating tank merely by adding sufficient caustic soda to precipitate a major portion of the copper either as the iron-free liquor is introduced, agitating the while, or by treatment in bulk. In the treatment in bulk of course, it is important to add the caustic with very great rapidity by reason of the bulk reaction desired. Whenever the caustic soda is in such high proportion that the major portion of the copper is precipitated, the blue sulphate crystals are precipitated. Thus if the precipitation by caustic soda is sufficient to deposit anywhere between 50 and 100% of the copper in a single reaction, say specifically 75%, 80% or 90%, blue basic copper sulphate crystals result. Boiling these then transforms them to green crystals. These after proper settling and flux of the precipitating tank may be transferred in sufficient quantity to any treating tank where it is desired to produce the green crystals.

To return then to the discussion of the continuous processes, the liquid from the full tank containing iron-free copper, on the second and succeeding day's runs, is introduced into a third tank into which these green crystals of basic copper sulphate are growing. The result of the introduction of the caustic soda under agitation and sufficient in quantity to precipitate 50 to 75% of the copper, is to precipitate crystals of green basic sulphate and one other. Upon the third tank's becoming filled with the iron-free copper solution, and this precipitation of 50 to 75% of the copper being complete, thereupon enough additional caustic soda is added to the now full tank to precipitate the remaining copper, and this precipitate is likewise of the green basic sulphate. All of it is characterized by large grain sizes and great density.

The reaction being entirely complete, and sufficient time for thorough settling having been allowed, the supernatant liquid of this third tank is withdrawn and carried away. Thereupon, the precipitate of green basic sulphate, if there has been accumulation sufficient to justify withdrawal, is withdrawn and subjected to the addition of caustic soda in such amount as to completely convert it into what now is of necessity a stable copper hydroxide by reason of the fact that we are dealing with the green copper sulphate and not with the blue. The soda content of the caustic combines with the sulphate radical and the resultant sodium sulphate is removed by washing. It may require, according to the size of the tanks used, several days to accumulate sufficient precipitate to justify withdrawal and conversion into hydroxide. With the 50,000 gallon size, three or four days or some times a week's accumulation is allowed before withdrawal of the precipitate from the third tank. However, there is always left in the tank a sufficient quantity of seed crystals of the green basic sulphate to assure resumption of the process when solution containing iron-free copper again is drawn from the initial receiving tanks. Each day, at the end of the treatment in this precipitating tank, the supernatant liquid is of course withdrawn, except for such portion as renders the sulphate sufficiently liquid to be stirred and pumped.

The initial receiving tanks used on alternate days are permitted to retain precipitation of ferric-phosphate for a number of days, since this is not very great and may be removed at intervals of one or two weeks or more, since the mere fact that these initial receiving taks are used alternately extends the time during which the removal of precipitate ferric-phosphate is made.

As stated at the beginning of this specification this copper hydroxide produced from the green basic copper sulphate is characterized by an essential and maintained stability as distinguished from an outstanding instability possessed by that copper hydroxide produced from the blue basic sulphate by caustic conversion. The unstable hydroxide produced from the basic blue copper sulphate, on account of the impurities resulting from its instability (largely copper oxide) is antagonistic to the attainment of maximum solvency of cellulose when the hydroxide is admixed with ammonia for the making of the cupro-ammonium cellulose spinning solution. The hydroxide produced by direct application of caustic from the green basic copper sulphate being thoroughly stable sets up none of these compounds which decrease its solvent action and enables me to attain the highest efficiency in producing by means of it a cupro-ammonium cellulose spinning solution.

I do not know certainly the reasons for this instability of the hydroxide derived from the blue crystals, but I believe them to be at least inclusive of the fact that the blue basic copper sulphate crystal carries water of crystallization (about two molecules) and that the presence of this water of crystallization may be continued in some part in the resultant copper hydroxide. This apparently makes for an unstable structure, the copper hydroxide tending to lose its water of composition and change partly to copper oxide (CuO). The color thereby changes from bright pure blue to something ranging from light brown to black, depending on the extent of loss of water of composition. The molecular compositions of the blue and green basic sulphates are as follows:

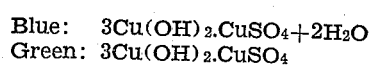

Blue:   $3Cu(OH)_2 \cdot CuSO_4 + 2H_2O$
Green:  $3Cu(OH)_2 \cdot CuSO_4$

The composition of the blue basic sulphate corresponds exactly to the above formula. In the green basic sulphate the proportion of $Cu(OH)_2$ and $CuSO_4$ may deviate slightly from the given formula, e. g. $3Cu(OH)_2 + 1.08\ CuSO_4$, this deviation depending on the rapidity of precipitation and the degree of acidity of the solution at time of precipitation. The salient difference however, as compared with the blue, is that it contains no water of crystallization and also that it yields a stable copper hydroxide on treatment with caustic soda and by the expression green basic copper sulphate as used in the claims, I mean a basic copper sulphate of such color which contains substantially no water of crystallization such as occurs in a definite molecular ratio and in which the molecular ratio of copper hydroxide to copper sulphate is substantially three to one.

Yet further advantage accrues from the use of my process in that I have introduced as a step of this process the removal of the iron and other impurities by the phosphate treatment according to my patent application Serial No. 103,910 filed October 3, 1936. By removing these impurities before resolution of the copper into solid compounds I prevent any part of these impurities, particularly the iron, from following the copper any further than the first stage of treatment. Before this invention in some situations one was confronted not only with inefficiency of solvent action and impurity of the resultant cupro-ammonium spinning solution due to the compounds resulting from instability, but also with weakening of the solvent action by impurity due to the presence of the iron and other foreign substances. It was possible in the old process to get rid of the iron and other foreign substances by filtration at the proper stage, but this process of riddance was cumbersome and expensive.

Finally the stable copper hydroxide so produced is characterized by large grain size and high density. This affords directly the high concentration so largely desirable in the preparation of the cupro-ammonium cellulose mixture or goo, because the copper hydroxide must be added in the form of a water suspension and is capable of higher concentration the larger and denser the grain. The higher the concentration the less will be the dilution of the ammonia used in making the goo. The large grain size and high density thus facilitates the making of a very concentrated goo as described in my earlier U. S. Patent No. 2,061,194 issued November 7, 1936 and U. S. Patent No. 2,047,466 issued July 14, 1936 to William Henry Furness.

Viewed in these lights, the high merit in the initial removal of impurities and the direct precipitation of green basic copper sulphate under caustic treatment should be fully apparent. The process is not only simplified in the number of chemicals and number of steps required, but is itself more efficient, and on top of that renders the production of the spinning solution simultaneously less expensive and more efficient.

The modifications of which my invention is susceptible and the varied applications are quite as great in number as those usually met with. In the first place, I would point out that in the treatment to remove the foreign iron in the initial receiving tanks, the amounts of acid and caustic may both be varied to points in excess of amounts required for the reactions desired. Such modification is always a good rule and results in a certainty of complete reactions which cannot otherwise be obtained. In the second phase of my invention, the treatment in the precipitating tank for basic copper sulphate, I have given an initial measure of caustic soda to be used as that sufficient to precipitate 50 to 75% of the copper. This may be decreased or increased, and I have used a percentage as high as 90 to 95. However, I desire to keep under that quantity necessary to precipitate 100% of the copper for the reason that green basic copper sulphate is more surely formed, and sufficient time of reaction is more fully guaranteed when the precipitation takes place in a solution more fully acid.

Once the seed body of green crystals is formed in the tank it is feasible for me to treat the day's run removed from the iron precipitating tank either as it is removed or in bulk. This is for the reason that the body of seed crystals which I maintain at all times within the treating tank is several times greater than the amount of green seed crystals obtained by treating the liquor of a day's run. I may make this proportion as low as 3 or as high as 10, and especially when the proportion is higher, bulk treatment may be resorted to, the caustic being added in the same rate per minute as during partial or progressive processing. A convenient and efficient mode is a combination of the bulk and partial or progressive treatments. According to this mode I permit the treating tank to fill to one-half its capacity with the iron-freed liquor and then commence the addition of alkali in the proportions given for the tank in which the body of seed crystals has been grown.

At the end of the day's run, the precipitation having been complete, the supernatant liquor is drawn off not wholly but leaving a residue sufficient to be admixed with the precipitated green crystals by agitation and permit them to be pumped off. Always there would be left in the tank a quantity of seed crystals several times that precipitated from a full tank charge, whether the full tank charge be that of one day's run or some fraction thereof.

My process may be modified by deliberately producing the blue basic copper sulphate crystals in bulk and the changing them in bulk to green which in turn I convert directly into stable copper hydroxide. This is a modified method to that heretofore described. Thus I would flow the liquor from the storage tank in which the iron is precipitated not into a green seed crystal tank, but into a blue seed crystal tank of sufficient capacity to treat in bulk by the method just now described to produce the blue crystals. This liquor having been converted by this process of precipitation of the major proportion of the copper in the presence of blue seed crystals, into blue basic copper sulphate, periodically the blue basic copper sulphate crystals would be withdrawn to yet another tank and there heated in bulk to remove the water of crystallization and convert them as a whole into green basic copper sulphate. This is all without any growing of green seed crystals. The green bulk crystals so produced are then treated as described hereinafter to convert into copper hydroxide.

This process, however, is not so efficient as that which I have described in principal place, the direct conversion of the iron free liquor into green basic copper sulphate, in that heat is required for the conversion of blue crystals and this heat as applied to the relatively large quantities to be treated in a modern rayon plant involves appreciable added expense. The expense is also added to slightly by the added cost of added equipment and slight additional labor.

Further, it must be quite apparent that alkali other than caustic soda may be used. There are several well known to be suitable in connection with such processes, for example, ammonia, sodium carbonate, etc.

A dilute waste acid liquor commonly treated by my method and its modifications to recover the copper is the following: One containing

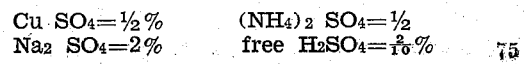

iron, silica, and aluminum in small and varying amounts.

The presence of the ammonia salt is very favorable to the process. Its presence is an important factor in the attainment of the greater density and grain size of the green basic sulphate and the resultant density and concentration of the copper hydroxide, and, in practice, I have found it desirable to add sufficient fresh ammonia sulphate to the solution to raise the percent content to $\frac{6}{10}$ of one percent.

There are a number of such solutions. In some of them the ammonia salt may be absent. In such case I would propose to treat the waste liquor with ammonia instead of caustic, thereby cutting down the volume of the precipitate and improving its grain size and compactness, thereby affording the direct concentration of the copper hydroxide produced which I desire without special treatment.

What I claim is:

1. The method of producing stable copper hydroxide which comprises first treating a quantity of dilute cold copper sulphate solution by administering a plurality of small dosages of an alkali, at intervals spaced substantially by the reaction time for each dosage to cause the growth of green basic copper sulphate crystals for seed purposes, drawing off the supernatant liquid, secondly adding fresh dilute cold copper sulphate solution while adding an alkali at a rate insufficient to precipitate all of the copper sulphate in the form of green crystals, adding to such solution containing precipitated crystals, sufficient additional alkali to precipitate the remaining copper sulphate in the form of green crystals, drawing off the supernatant liquid, repeating said second named series of steps, said method being carried out without application of heat from external sources, removing only a portion of said green crystals from time to time as the growth warrants but retaining a substantial portion for seed purposes, and treating the removed green crystals with an alkali to produce stable copper hydroxide.

2. The method of producing stable copper hydroxide which comprises first treating a quantity of dilute cold copper sulphate solution containing an ammonium salt by administering a plurality of small dosages of an alkali, at intervals spaced substantially by the reaction time for each dosage to cause the growth of green basic copper sulphate crystals for seed purposes, drawing off the supernatant liquid, secondly adding fresh dilute cold copper sulphate solution likewise containing an ammonium salt while adding an alkali at a rate insufficient to precipitate all of the copper sulphate in the form of green crystals, adding to such solution containing the precipitated crystals, sufficient additional alkali to precipitate the remaining copper sulphate in the form of green crystals, drawing off the supernatant liquid, repeating said second named series of steps, said method being carried out without application of heat from external sources, removing only a portion of said green crystals from time to time as the growth warrants but retaining a substantial portion for seed purposes, and treating the removed green crystals with an alkali to produce stable copper hydroxide.

3. The method of producing stable copper hydroxide which comprises flowing a quantity of dilute cold copper sulphate solution into a bath containing a quantity of green basic copper sulphate seed crystals while adding an alkali at a rate insufficient to precipitate all of the copper sulphate in the form of similar green crystals, thereafter adding to such solution containing precipitated crystals, sufficient additional alkali to precipitate the remaining copper sulphate in the form of green crystals, drawing off the supernatant liquid, repeating said process, said method being carried out without application of heat from external sources, removing only a portion of said green crystals as the growth warrants, but retaining a substantial portion for seed purposes, and treating the removed green crystals with an alkali to produce stable copper hydroxide.

4. The method of producing stable copper hydroxide which comprises flowing a quantity of dilute cold copper sulphate solution containing an ammonium salt into a bath containing a quantity of green basic copper sulphate seed crystals while adding an alkali at a rate insufficient to precipitate all of the copper sulphate in the form of similar green crystals, thereafter adding to such solution containing precipitated crystals, sufficient additional alkali to precipitate the remaining copper sulphate in the form of green crystals, drawing off the supernatant liquid, repeating said process, said method being carried out without application of heat from external sources, removing only a portion of said green crystals as the growth warrants, but retaining a substantial portion for seed purposes, and treating the removed green crystals with an alkali to produce stable copper hydroxide.

5. The method of producing green basic copper sulphate from dilute cold waste acid liquor derived from the treatment of the coagulated fibre of the cupro-ammonium process of producing rayon yarn, which consists in first treating a quantity of the liquor to free it of iron content, progressing the iron free solution to a container having seed crystals of green basic copper sulphate, while adding an alkali to the solution at a rate insufficient to precipitate all of the copper sulphate, thereafter adding to the container enough alkali to complete the precipitation of the remaining copper sulphate in the form of green crystals, said method being carried out without application of heat from external sources.

6. The method of producing stable copper hydroxide from green basic copper sulphate from dilute cold waste acid liquor derived from the treatment of the coagulated fibre of the cupro-ammonium process of producing rayon yarn, which consists in first treating a quantity of the liquor to free it of iron content, progressing the iron free solution to a container having seed crystals of green basic copper sulphate, while adding an alkali to the solution at a rate insufficient to precipitate all of the copper sulphate, thereafter adding to the container enough alkali to complete the precipitation of the remaining copper sulphate in the form of green crystals, said method being carried out without application of heat from external sources, drawing off the supernatant liquor, removing a portion of said green basic copper sulphate crystals and treating said removed crystals with an alkali to produce a stable copper hydroxide.

7. The method of producing green basic copper sulphate from the waste acid liquor derived from the treatment of the coagulated fibre of the cupro-ammonium process of producing rayon yarn, which consists in first substantially freeing the liquor of its iron content, progressing the solution freed from the iron to a region remote from the region of the iron removal and characterized by the presence of seed crystals of green basic copper sulphate, and in this latter region at ordinary temperature treating the progressed solution under constant agitation with an alkali added at a rate less than that which will tend to precipitate crystals of blue basic copper sulphate in the presence of the seed crystals of green basic copper sulphate.

8. The method of producing green basic copper sulphate from the waste acid liquor derived from the treatment of the coagulated fibre of the cupro-ammonium process of producing rayon yarn without substantial heating which consists in precipitating green basic copper sulphate in the presence of green basic copper sulphate seed crystals by alkali treatment and in which the alkali applied in the region of the seed crystals of green basic copper sulphate is applied in sufficient quantity to precipitate as green basic copper sulphate 50 to 75% of the copper of the sollution as it is progressively drawn into this region and when the drawing in of the copper solution is completed by continuing the addition of alkali until all remaining copper from the solution is precipitated likewise in the form of green basic sulphate, said method being carried out without application of heat from external sources.

9. Process according to claim 7 in which the seed crystals are maintained in quantity manifoldly greater than the quantity produced during the period of precipitation.

10. Process according to claim 7 in which the seed crystals of green basic copper sulphate are produced initially by alkali treatment of the iron free solution in stages, precipitating but a few per cent of the copper at a time from the solution, thereby gradually building up a body of green seed crystals.

11. A process according to claim 7 in which the seed crystals of green basic copper sulphate are initially produced by first growing blue basic copper sulphate crystals, by rapid alkali treatment of an iron-free waste liquor solution to precipitate the copper carried in the solution and thereafter heating sufficiently to drive out the water of crystallization to transform the blue basic sulphate crystals into green basic sulphate crystals.

12. The method of producing green basic copper sulphate which comprises first treating a quantity of dilute, cold copper suphate solution containing an ammonium salt, by administering a plurality of small dosages of an alkali at intervals spaced substantially by the reaction time for each dosage to cause the growth of green basic copper sulphate crystals for seed purposes, drawing off the supernatant liquid, secondly adding fresh dilute cold copper sulphate solution likewise containing an ammonium salt while adding an alkali at a rate insufficient to precipitate all of the copper sulphate in the form of green crystals, adding to such solution containing the precipitated crystals, sufficient additional alkali to precipitate the remaining copper sulphate in the form of green crystals, drawing off the supernatant liquid, repeating said second named series of steps, removing only a portion of said green crystals from time to time as the growth warrants but retaining a substantial portion for seed purposes, said method being carried out without application of heat from external sources.

13. The method of producing green basic copper sulphate which comprises treating a quantity of dilute, cold copper sulphate solution having a small percentage of an ammonium salt, by administering a plurality of small dosages of an alkali at intervals spaced substantially by the reaction time for each dosage to cause the growth of green basic copper sulphate crystal for seed purposes, drawing off the supernatant liquid, thereafter adding fresh dilute cold copper sulphate solution, and thereafter adding alkali at a rate slow enough to insure the formation of green crystals only, said method being carried out without application of heat from external sources.

14. Method of producing at ordinary temperatures green basic copper sulphate from copper sulphate in a solution which consists in introducing a determinate bulk of the copper sulphate solution to the presence of green basic copper sulphate seed crystals of sufficient quantity to substantially influence the precipitation of further crystals of green basic copper sulphate upon the introduction of an alkali, introducing an alkali at a rate substantially less than that which tends to produce blue basic copper sulphate, and continuing the introduction of the alkali until substantially all the copper of the entire bulk of copper sulphate solution has been precipitated out as green basic copper sulphate, the solution being agitated throughout the process, said method being carried out without application of heat from external sources.

15. Process according to claim 14 in which the seed crystals of green basic copper sulphate are produced by first placing the bulk of the copper sulphate in solution in the same region where the seed crystals are desired, introducing the alkali in stages such as to precipitate but a few per cent of the copper in each stage as green basic copper sulphate crystals, thereby gradually building up the body of green seed crystals, permitting the seed crystals to settle, drawing off the liquor and thereupon continuing the process according to claim 14.

16. Method according to claim 14 in which the seed crystals of green basic copper sulphate are produced initially from cold copper sulphate solution having a small percentage of ammonium salt, by administering a plurality of small dosages of an alkali at intervals spaced substantially by the reaction time for each dosage to cause the growth of green basic copper sulphate crystal for seed purposes, and drawing off the supernatant liquid.

17. The method of producing green basic copper sulphate from the waste acid liquor derived from the treatment of the coagulated fibre of the cupro-ammonium process of producing rayon yarn, said method being carried out without application of heat from external sources, which consists in precipitating green basic copper sulphate in the presence of green basic copper sulphate seed crystals by alkali treatment and in which the alkali applied in the region of the seed crystals of green basic copper sulphate is applied at a rate less than than which will tend to precipitate crystals of blue basic copper sulphate in the presence of seed crystals of the green basic copper sulphate.

SVERRE GULBRANDSEN.